Takishima

[15] 3,678,835
[45] July 25, 1972

[54] AUTOMATIC FOCUSING DEVICE FOR CAMERAS AND THE LIKE

[72] Inventor: Yoshiyuki Takishima, Tokyo, Japan
[73] Assignee: Canon Kabushiki Kaisha, Tokyo, Japan
[22] Filed: Aug. 12, 1970
[21] Appl. No.: 63,059

[30] Foreign Application Priority Data

Aug. 20, 1969 Japan..................................44/65819

[52] U.S. Cl. ..................................95/44 R, 95/45, 352/140, 353/101, 355/56, 355/57
[51] Int. Cl.................E01c 19/12, E01c 19/48, E01c 23/06
[58] Field of Search..........................95/44 R, 45; 355/56, 57; 353/101; 352/140

[56] References Cited

UNITED STATES PATENTS 3,336,851  8/1967  Warshawsky.........................355/56 X
3,511,155  5/1970  Yamada................................95/44

*Primary Examiner*—Samuel S. Matthews
*Assistant Examiner*—Richard A. Wintercorn
*Attorney*—Joseph M. Fitzpatrick, John Thomas Cella, Charles B. Cannon, Lawrence H. Scinto, Carroll G. Harper, Charles W. Bradley, Edwin T. Grimes, William J. Brunet and Robert L. Baechtold

[57] ABSTRACT

Automatic focusing device for a camera has a chopper and a separator. The chopper is located in front of a deflecting device for directing two different light beams on a common photoelectric effect element. The separator is to separate into two signals the output of the photoelectric effect element which are amplified by a single AC amplifier. The separator is synchronized with the chopper.

11 Claims, 5 Drawing Figures

AUTOMATIC FOCUSING DEVICE FOR CAMERAS AND THE LIKE

FIELD OF THE INVENTION

The present invention relates to an automatic focusing device for cameras and the like.

DESCRIPTION OF PRIOR ART

There have been proposed various automatic focusing systems. In one system, the out-of-focus is detected by a photoelectric element such as CdS so as to utilize its minimum or maximum output. In another system, the luminance of light beams passing through two windows of a device similar in construction as a range-finder is compared by a photoelectric effect element. In still another system, the infrared rays are projected from the side of a camera and the reflected infrared rays are detected.

When such automatic focusing devices are used together with the cameras, there arises a problem of the difference in quality of photoelectric effect elements used because the luminance of the light rays intercepted by the cameras varies in a wide range (−3 to 18 in EV) and because the environmental temperature also varies in a wide range (−20° C to 50° C). It is therefore impossible to use a plurality of photoelectric effect elements in one automatic focusing device for comparison of their outputs. Furthermore, it is extremely difficult to provide an amplifier with an amplification factor higher than 120 dB for a very weak signal of the order of $10^{-3}$ $\mu A$.

SUMMARY OF THE INVENTION

The automatic focusing device of this invention provides a chopper in front of a deflecting device for directing two different light beams upon a common photoelectric effect element in order that said two different light beams may be alternately made incident upon said photoelectric effect element; and a separator in order to separate into two signals the outputs of said photoelectric effect element which are amplified by a single A-C amplifier, said separator being in synchronism with said chopper.

As mentioned, according to this invention, two different light beams or signals are detected by a common photoelectric effect element so that the photoelectric effect elements of the class generally employed in the cameras may be used. Since a chopper is used, the output signals of the photoelectric effect element may be converted into AC signals which may be advantageously amplified with a high gain in a relatively simple manner. The chopper time-divides the light beams so that its dynamic range is wide compared with the diode, transistor choppers, magnetmechanical choppers, etc., whereby the device becomes simple in design. The voltage variation may be neglected because two signals are amplified by the common amplifier. (In general, in case of an amplifier with a high gain of 120 dB, the voltage variation of the order of one-tenth is no preferably). Therefore, the operation with a higher degree of accuracy may be ensured even for a very weak light signal.

BRIEF DESCRIPTION OF THE DRAWING

FIG. 5 is a diagrammatic view illustrating the so-called active exterior detecting system employing a light projector and detecting the light which has not passed through a photographic lens or the like.

DESCRIPTION OF THE PREFERRED EMBODIMENT

Figure 1:
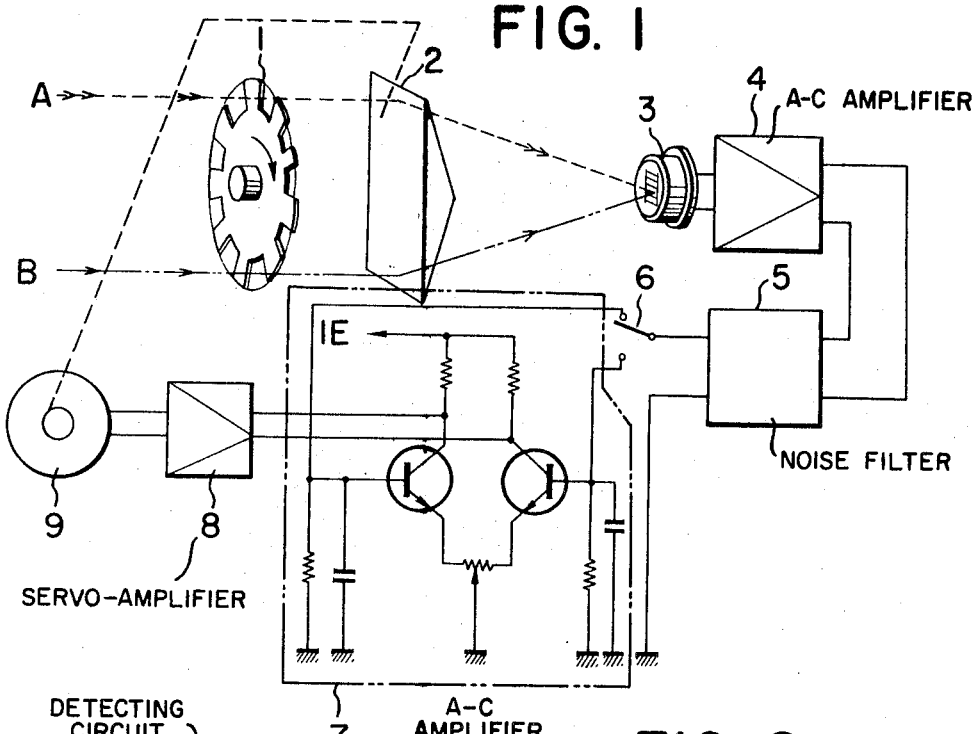
FIG. 1 is a diagrammatic view illustrating an automatic focusing device in accordance with the present invention.

Referring to FIG. 1, the two different light beams of signals A and B, which are signals from, for example, range finder of a camera, may pass through a single window or two spaced apart windows of a range finder. A chopper 1 alternately passes and intercepts the light beams A and B in synchronism with a switch 6. The chopper 1 generally has an odd number of shielding plates. The light beams passed through the chopper 1 are deflected by a deflecting means 2 such as a prism so that both of the light beams A and B passed through the chopper 1 may be impinged upon a common photoelectric effect element 3. That is, the photoelectric effect element 3 alternately intercepts the light beams A and B in a time-division reception manner. The outputs of the photoelectric effect element 3 are amplified by a common AC amplifier 4 and the noise is cut off by a filter 5. As has been pointed above, the switch 6 is switched in synchronism with the AC signals into which the converted the light beams or signals A and B by the chopper 1 so that the two different AC signals representative of the light beams A and B may be fed into the detecting terminals of a differential amplifier 7. The outputs of the difference amplifier 7 are amplified by a servo-amplifier 8 the output of which is fed into a servomotor 9 for driving a portion of a lens system to thereby automatically focus the image.

Figure 2:
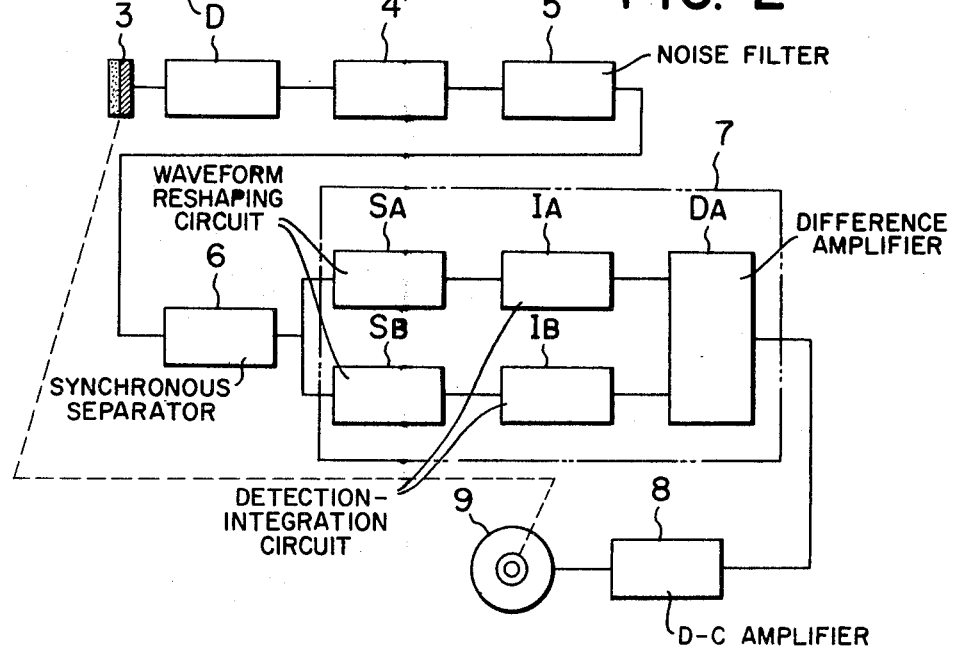
FIGS. 2 and 3 are the electronic block and circuits diagrams thereof.
Figure 3:
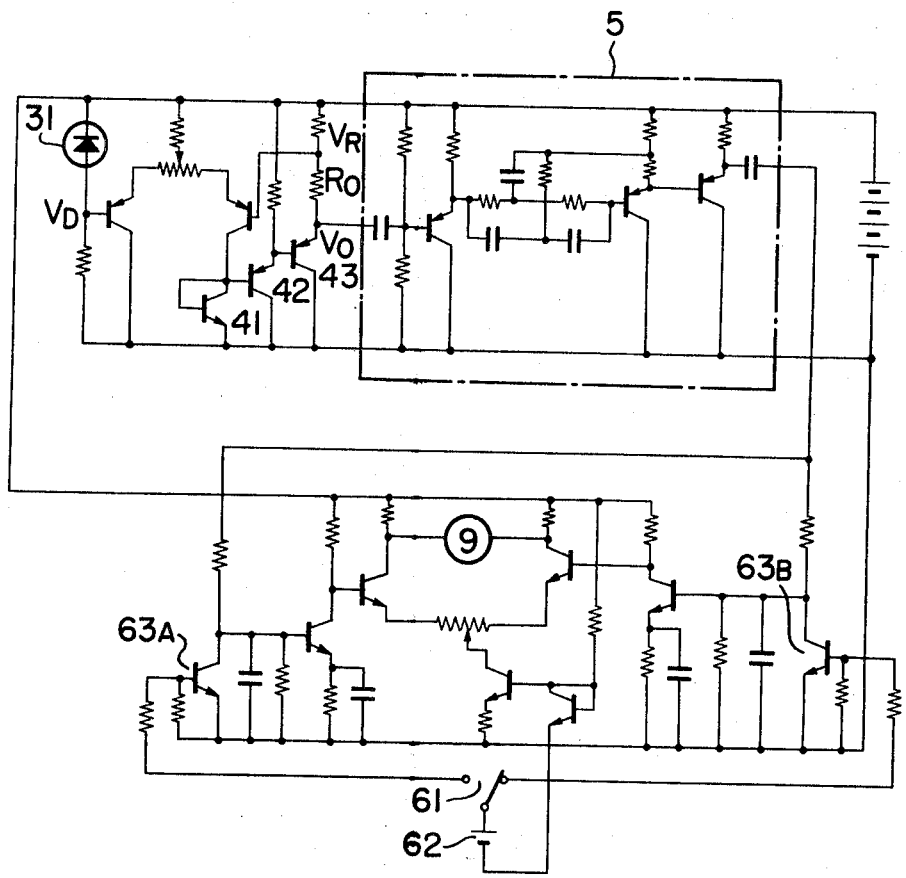

According to the present invention, the AC amplifier is used so as to facilitate the operation. Referring to FIGS. 2 and 3 illustrating the electronic block and circuit diagrams of an automatic focusing device in accordance with the present invention, the output of the photoelectric effect element 3 is fed into the AC amplifier 4 through a detecting circuit D and the noise is filtered by the filter 5. The switch or synchronous separator 6 is synchronized with the chopping of the inputs to the photoelectric effect element 3. The outputs of the synchronous separator 6 are fed into the difference amplifier DA through waveform reshaping circuits SA or SB and detecting-integration circuits IA or IB respectively. The outputs of the difference amplifier DA are fed into the servomotor 9 through a D-C amplifier 8. For example, the servomotor 9 so controls the photoelectric effect element 3 as to locate it in the focusing reference position. Referring to FIG. 3, a photoelectric effect element 31 is a photodiode connected through a resistor and its output level V-D is compared with a reference signal level VR which is the signal fed back through a load resistor $R_o$ of the output $V_o$ of the signal AC amplifier (consisting of transistors 41, 42 and 43). The detected output $V_o$ is fed into the noise cut-off filter 5 in the next stage whose output is fed into the synchronous separator comprising a switch 61 which is switched in synchronism with the AC signals into which are converted the light beams or signals A and B by the chopper 1 (See FIG. 1), a battery 62, and transistors 63A and 63B. The servomotor 9 is connected as a load of the differential amplifier so that when the outputs signals which represent the light signals A and B and are alternately switched by the switch 61 coincide with each other, the servomotor 9 stops its rotation. That is, the reference focusing position is always maintained or tracked.

When the phototransistors are employed instead of the transistors 63A and 63B for receiving the outputs of the chopper 1, the switch 61 and the battery 62 may be eliminated. When the inputs are very low, the outputs of the phototransistors must be amplified before they are fed into the waveform reshaping circuits or detecting-integration circuits.

Figure 4:
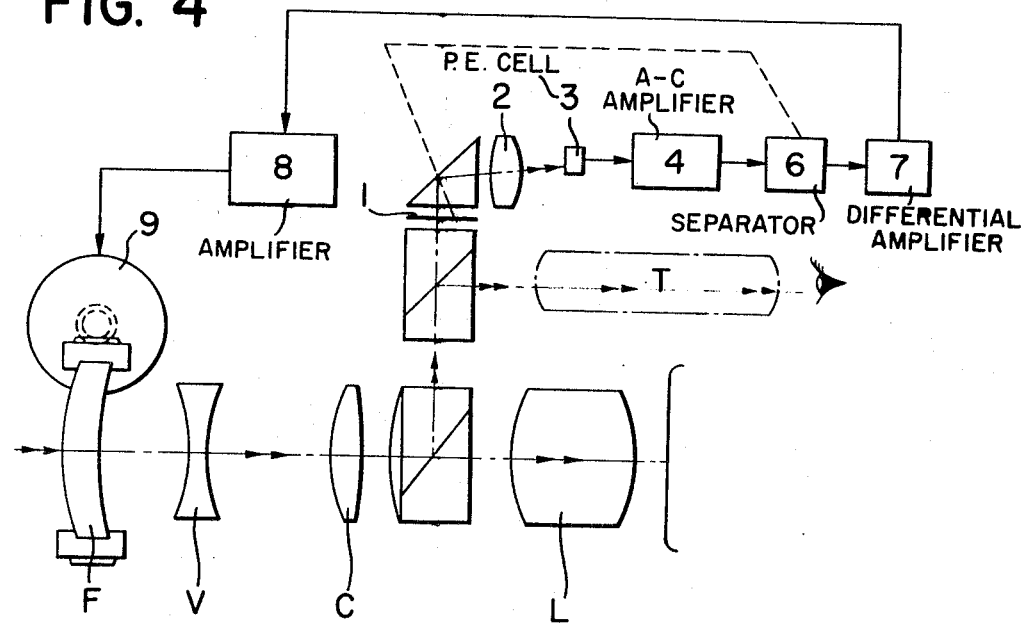
FIG. 4 is a diagrammatic view illustrating a passive device having a photoelectric effect element of the type intercepting the light through the lens, but having no light projector.

Next referring to FIG. 4, the so-called passive device having a photoelectric effect element of the type intercepting the light beams through-the-lens (TTL system) and without a light projector will be described. In FIG. 4, F is a focusing lens of a zoom lens; V is a variator; C is a compensator and L is an image forming lens. The light beams passing through the lenses F, V and C are chopped by the chopper 1, and deflected by a lens 2 so that the nearly coincident images are formed upon and in the vicinity of the photoelectric effect element 3. Element 4 is a single AC amplifier; 6, a separator; 7, a differential amplifier; 8, an amplifier; and 9, a motor. When the lens F is in the deocusing position, the motor 9 is rotated by the output of the photoelectric effect element 3. Since the motor 9 rotates depending upon a degree and direction of defocusing the lens F is always maintained in the focusing position. T indicates a telescope constituting a viewfinder.

Figure 5:
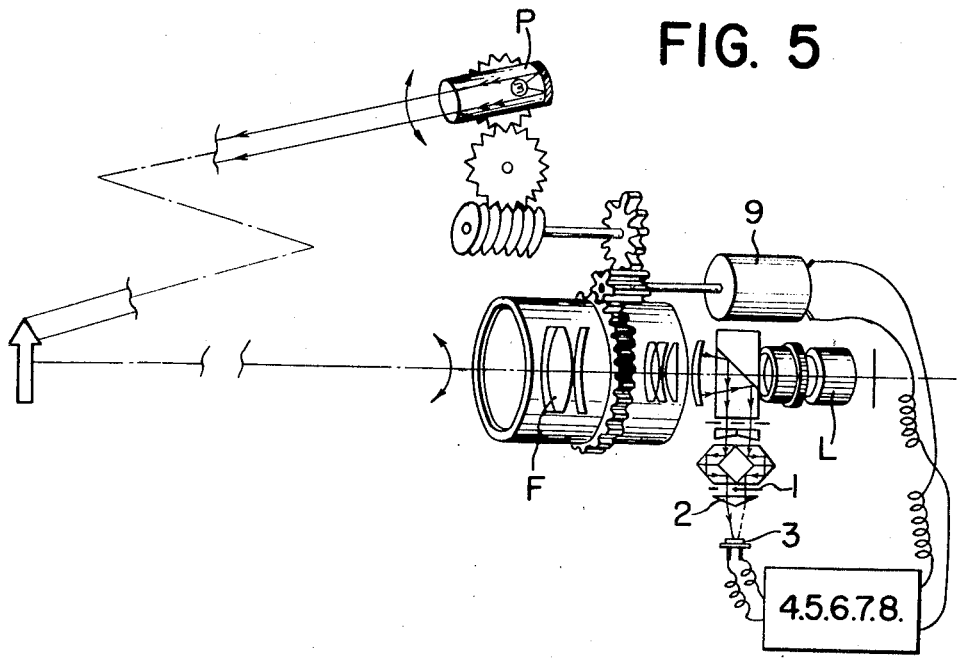

Referring to FIG. 5, the so-called active device of the type having a light projector so as to detect the light rays reflected by a subject without utilizing the photographic lens will be described. This is also called as "exterior detecting system." A light projector P is driven in synchronism with the lens F by the servomotor 9 in such a manner that when the light reflected by the subject is precisely incident upon the photoelectric effect element, the motor 9 is stopped. In this arrangement, the image is focused upon the film plane.

What is claimed is:

1. An automatic focusing device for cameras and the like comprising a chopper provided in front of a deflecting device for directing two different light beams upon a common photoelectric effect element arranged after the deflecting device in order that said two different light beams may be alternately incident upon said photoelectric effect element, an AC amplifier to amplify the output of the photoelectric effect element, a filter to cut the noise of the output from the amplifier, a separator to separate into two signals the output of the filter, the separator being in synchronism with said chopper, said device further including an electronic circuit means comprising the photoelectric effect element, the AC amplifier, a detecting circuit for feeding the output of the photoelectric effect element to the AC amplifier, the filter to filter the noise from the output of the AC amplifier, the separator synchronizing with the chopping of the inputs to the photoelectric effect element, further circuit means for reshaping the waveform of the output of the separator to be fed into a different amplifier, detecting-integral circuit means to receive the output of the reshaping circuit means and to feed the output thereof to a difference amplifier, a servo motor to receive the output of the difference amplifier through a DC amplifier for controlling the photoelectric effect element to position at the focusing reference position.

2. In automatic focusing device for cameras or the like, the combination which includes, means defining a light path for permitting passage of two different light beams, a chopper means provided in the light path for permitting alternate passage of each of two different light beams, a common photoelectric conversion element for each of said two different light beams, a deflecting device for directing each of said two different light beams upon the common photoelectric conversion element and arranged such that the two different light beams may be alternately incident upon the common photoelectric conversion element, an AC amplifier connected to amplify the output of the common photoelectric conversion element, a separator connected to said amplifier to separate into two signals the output from the common photoelectric conversion element, the separator being connected to operate in synchronism with the chopper means, a motor means adapted to actuate the automatic focusing device for controlling same, and a control circuit for the control of the motor means, the control circuit being responsive to both of the separated two signals.

3. An automatic focusing device according to claim 2, which further comprises a filter means connected to cut the noise of the output from the AC amplifier.

4. An automatic focusing device according to claim 2, in which the control circuit comprises a differential amplifier.

5. An automatic focusing device according to claim 2, in which the motor means is adapted to move the photoelectric conversion element to position at a focusing reference position.

6. An automatic focusing device according to claim 2, in which the motor means is adapted to move the deflecting device to position at the focusing reference position.

7. An automatic focusing device according to claim 2, further including a photographing objective lens, said photoelectric conversion element being positioned to receive light passing through at least part of said photographing objective lens.

8. An automatic focusing device according to claim 7, in which the photographing objective lens comprises a variator and a compensator for a zoom-lens.

9. An automatic focusing device according to claim 2, in which a light source providing the two different light beams is positioned at the side of the focusing device.

10. An automatic focusing device according to claim 9, in which the motor means is adapted to move the light source to position at the focusing reference position to project a reference light beam onto an object to be focused.

11. A camera having an automatic focusing device which includes a lens system comprising a focusing lens of a zoom lens, a variator, a compensator and an image forming lens for passing the light therethrough, a chopper to chopping light beams from the affocal light path of the zoom lens, a deflecting lens to focus the light beams in the vicinity of the photoelectric effect element, a separator, a single AC amplifier to receive the output of the photoelectric effect element and to fee thus amplified signal to said separator, said separator being synchronized with the chopper, a differential amplifier connected to receive the outputs of the separator, means for applying outputs to forward it from said differential amplifier to a servo motor to rotate the motor to maintain the focusing lens of the zoom lens in the focusing position.

* * * * *